(12) United States Patent
Scheffer

(10) Patent No.: US 11,337,774 B2
(45) Date of Patent: May 24, 2022

(54) METHOD AND SYSTEM FOR DETECTING THE ALIGNMENT OF AT LEAST ONE DRILL SLEEVE IN A DRILL TEMPLATE PRODUCED FOR IMPLANTING DENTAL IMPLANTS IN THE CORRECT POSITION

(71) Applicant: Axel Scheffer, Meerbusch (DE)

(72) Inventor: Axel Scheffer, Meerbusch (DE)

( * ) Notice: Subject to any disclaimer, the term of this patent is extended or adjusted under 35 U.S.C. 154(b) by 847 days.

(21) Appl. No.: 16/095,255

(22) PCT Filed: Jun. 22, 2016

(86) PCT No.: PCT/EP2016/001058
§ 371 (c)(1),
(2) Date: Oct. 19, 2018

(87) PCT Pub. No.: WO2017/182046
PCT Pub. Date: Oct. 26, 2017

(65) Prior Publication Data
US 2019/0142548 A1     May 16, 2019

(30) Foreign Application Priority Data
Apr. 20, 2016 (DE) .......................... 102016004641.4

(51) Int. Cl.
*A61C 1/08* (2006.01)
*A61C 9/00* (2006.01)
*A61C 13/00* (2006.01)

(52) U.S. Cl.
CPC ............ *A61C 1/084* (2013.01); *A61C 9/0053* (2013.01); *A61C 13/0004* (2013.01)

(58) Field of Classification Search
CPC ....... A61C 1/084; A61C 1/009; A61C 1/0089; A61C 9/0053; A61C 13/0004; A61B 6/14; A61B 6/145
See application file for complete search history.

(56) References Cited

U.S. PATENT DOCUMENTS

| | | | |
|---|---|---|---|
| 5,015,183 A | 5/1991 | Fenick | |
| 7,153,132 B2 * | 12/2006 | Tedesco | A61C 1/084 433/76 |

(Continued)

FOREIGN PATENT DOCUMENTS

| | | |
|---|---|---|
| DE | 103 00 301 A1 | 7/2004 |
| DE | 103 30 758 A1 | 2/2005 |

(Continued)

OTHER PUBLICATIONS

Machine translation of DE-102008060522 (Year: 2008).*

(Continued)

*Primary Examiner* — Edward Moran
*Assistant Examiner* — Matthew P Saunders
(74) *Attorney, Agent, or Firm* — Norris McLaughlin, P.A.

(57) ABSTRACT

A method for detecting alignment of a drill sleeve in a drilling template relative to the jaw of a person, includes: creating an impression element including a negative impression of the jaw structure; creating an X-ray template from the impression element by disposing spaced X-ray visible reference bodies in the impression element; carrying out a first three-dimensional radiological detection, in which the jaw, together with the X-ray template fastened to the jaw, is detected by DVT or CT; creating a drilling template from the X-ray template by fastening a drilling sleeve in/on the X-ray template; inserting a reference object, including spaced X-ray visible reference bodies, into the drill sleeve; and carrying out a second three-dimensional radiological detection, in which only the drilling template, which is outside the jaw, including the reference bodies thereof, and the reference object inserted therein, including the reference bodies thereof, are detected.

9 Claims, 5 Drawing Sheets

(56) References Cited

U.S. PATENT DOCUMENTS

| | | | |
|---|---|---|---|
| 7,574,025 B2* | 8/2009 | Feldman | A61C 1/084 382/128 |
| 8,320,612 B2 | 11/2012 | Knobel et al. | |
| 8,480,396 B2 | 7/2013 | Saliger et al. | |
| 8,523,566 B2* | 9/2013 | Suter | A61C 1/084 433/72 |
| 8,673,454 B2 | 3/2014 | Basler et al. | |
| 8,794,964 B2 | 8/2014 | Haber | |
| 8,893,387 B2 | 11/2014 | Basler et al. | |
| 9,022,782 B2 | 5/2015 | Cheng et al. | |
| 10,092,369 B2 | 10/2018 | Scheffer | |
| 2004/0219479 A1* | 11/2004 | Malin | A61C 1/084 433/75 |
| 2005/0084144 A1* | 4/2005 | Feldman | A61C 9/00 382/128 |
| 2006/0105291 A1 | 5/2006 | Stein et al. | |
| 2008/0176187 A1* | 7/2008 | Stumpel | A61C 1/084 433/196 |
| 2008/0220390 A1* | 9/2008 | Klein | A61C 1/084 433/76 |
| 2008/0228303 A1* | 9/2008 | Schmitt | G05B 19/4097 700/98 |
| 2009/0004625 A1* | 1/2009 | Esposti | A61B 17/176 433/165 |
| 2009/0042167 A1* | 2/2009 | Van Der Zel | A61C 13/0003 433/215 |
| 2009/0136902 A1* | 5/2009 | Zundorf | A61C 1/084 433/223 |
| 2009/0274990 A1* | 11/2009 | Kim | A61B 17/176 433/75 |
| 2009/0298008 A1* | 12/2009 | Groscurth | A61C 1/084 433/74 |
| 2010/0092912 A1* | 4/2010 | Machado | A61C 1/084 433/76 |
| 2010/0296710 A1* | 11/2010 | Schneider | A61C 9/0053 382/128 |
| 2010/0297574 A1* | 11/2010 | Llop | A61C 8/0089 433/75 |
| 2011/0066267 A1 | 3/2011 | Schmitt | |
| 2011/0136077 A1 | 6/2011 | De Moyer | |
| 2011/0151399 A1* | 6/2011 | De Clerck | A61C 13/0004 433/75 |
| 2011/0208195 A1* | 8/2011 | Palti | A61C 1/084 606/80 |
| 2012/0257936 A1* | 10/2012 | Abboud | A61C 1/084 408/1 R |
| 2013/0171587 A1* | 7/2013 | Akutsu | A61C 1/084 433/173 |
| 2013/0309628 A1* | 11/2013 | Orth | A61C 1/084 433/75 |
| 2014/0234803 A1* | 8/2014 | Hehn | A61C 9/0053 433/214 |
| 2015/0072313 A1* | 3/2015 | Thiel | A61C 9/0073 433/214 |
| 2015/0099241 A1 | 4/2015 | Chen et al. | |
| 2018/0243061 A1* | 8/2018 | Lehner | A61C 13/34 |

FOREIGN PATENT DOCUMENTS

| | | | | |
|---|---|---|---|---|
| DE | 10 2004 063 417 A1 | | 7/2006 | |
| DE | 10 2005 040 739 A1 | | 3/2007 | |
| DE | 102008060522 A1 | * | 6/2010 | A61B 6/14 |
| DE | 10 2009 003 183 A1 | | 11/2010 | |
| DE | 10 2011 083439 A1 | | 3/2013 | |
| DE | 20 2012 005 510 U1 | | 8/2013 | |
| DE | 202012005510 U1 | * | 8/2013 | A61B 6/14 |
| DE | 10 2014 007870 A1 | | 12/2015 | |
| EP | 2361584 A1 | * | 8/2011 | A61C 1/084 |
| EP | 2 957 251 A1 | | 12/2015 | |
| EP | 2957251 | * | 12/2015 | |
| JP | 2003-245289 A | | 9/2003 | |
| WO | 2004/076106 A1 | | 9/2004 | |

OTHER PUBLICATIONS

J. D'haese, et al., "Accuracy and Complications Using Computer-Designed Stereolithographic Surgical Guides for ORal Rehabilitation by Means of Dental Implants: A Review of the Literature", Clinical Implant Dentistry and Relates Research, vol. 14, No. 3, 2012, pp. 321-335.

N. Van Assche, et al., "Accuracy of computer-aided implant placement", Clinical Oral Implants Research, 23 (Suppl. 6), 2012, pp. 112-123.

\* cited by examiner

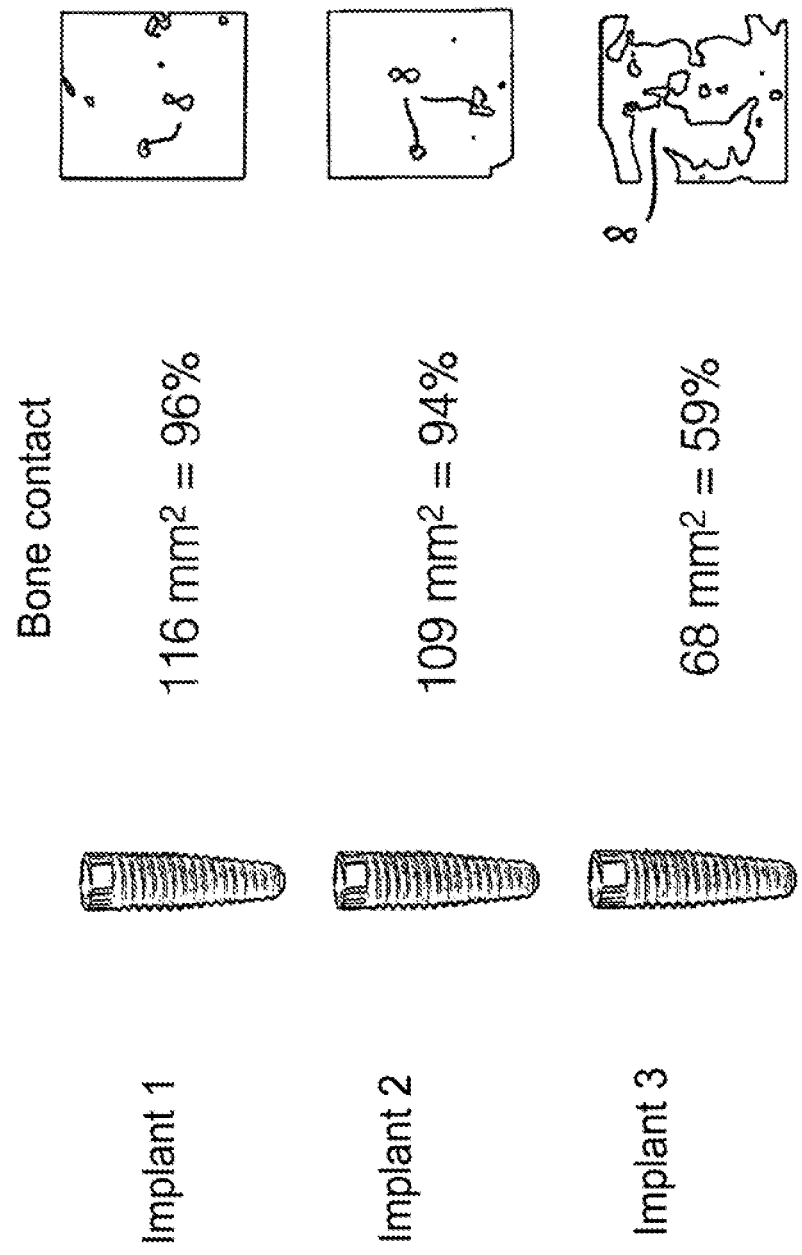

METHOD AND SYSTEM FOR DETECTING THE ALIGNMENT OF AT LEAST ONE DRILL SLEEVE IN A DRILL TEMPLATE PRODUCED FOR IMPLANTING DENTAL IMPLANTS IN THE CORRECT POSITION

The invention relates to a method and to a system for detecting the alignment of at least one drill sleeve in a drilling template, and in particular relative to the jaw of a person. Preferably, the invention relates to a method that makes it possible, based on the detected alignment, to check the accuracy of a guide channel, defined by a drill sleeve, for guiding a drilling tool, in which the at least one guide channel to be checked is disposed, through a drill sleeve defining the guide channel, on an impression element including a negative impression of the jaw structure as a function of position data.

The position data is planning data which determines the desired position, which is to say the target position, of the guide channel or the drill sleeve. Such position data may be created, for example, by virtually placing the drill sleeve/guide channel or an implant in a virtual 3D jaw representation of a patient, which is to say, this may result from virtual planning of a guide channel, for example in a 3D imaging process with a digital volume tomography (DVT) image, a computed tomography (CT) image, or a surface rendering (such as STL data).

During the creation of a drilling template for dental purposes, deviations may occur between the actual position of a drill sleeve and the target position, so that the actual position data of a drill sleeve consequently also deviates from the aforementioned target position data. When such a drilling template is used, deviation of the implant from the planned position also consequently occurs.

So as to establish whether there is deviation, and whether the deviation is still within an allowable range, checks are carried out using the finished drilling template. These checks have previously been very complex and are thus used only in rare instances.

Methods of this type are known in the prior art. Essentially, these methods are based on ascertaining the position of a reference body, which is introduced into the drill sleeve to be checked, by way of projection or tactile geometry detection.

With the previously used checking methods, deviations from the target value are output as numerical values. This manner of representing deviations from the target value is generally difficult to grasp and, to date, surgeons have not been able to apply this to the corresponding jaw position.

It is therefore a first object of the invention to provide simple and precise detection of the alignment of at least one drill sleeve in a drilling template. It is a preferred second object to be able to carry out an evaluation of the measured alignment based on the detected data, and in particular to make it possible to establish deviations from the planned target positions of a guide channel. A preferred further object is to reproducibly represent established deviations, so as to ensure that the drillings provided for the implantation do not injure any nerve tracts or other neighboring structures at risk, or do not exceed safety clearances. In particular, the invention is to allow the practitioner to check the position of the guide channel, defined by a drill sleeve, or the implant to be positioned before the surgery for safety, which is to say, to check whether the required surgical preparation for implantation would injure neighboring structures, which are at risk, based on two- and three-dimensional visualizations.

The object is achieved according to the invention by creating an impression element including a negative impression of the jaw structure of a person, in which at least three X-ray visible/X-ray attenuating reference bodies that are disposed at a distance from one another are introduced for forming an X-ray template.

An impression element may, for example, be designed as a deep-drawn negative mold, to which the reference bodies for forming the X-ray template are fastened. Such fastening may take place by gluing or insertion in created drill holes.

This impression element designed as a deep-drawn negative mold, or any impression element produced in another manner, can preferably be produced on a jaw model (generally made of plaster) or based thereon, wherein the jaw model is obtained, for example, by casting an impression that is created, for example, by way of an elastic impression compound.

So as to produce the deep drawing mold or other types of impression elements, it is furthermore possible, for example, to block out/fill in undercut dental or jaw structures of the jaw model prior to production, and in particular prior to the deep drawing process. Thus, an impression element according to the invention, which is preferably made of a hard and torsion-resistant material, preferably does not include any undercuts with respect to a defined placement direction onto the jaw structure of a patient. This notably ensures that no injuries occur during the insertion of the impression element.

As an alternative, the jaw model, and the impression element, may also be produced by way of a 3D scan in the mouth of the patient and subsequent production by way of 3D printing or stereolithography. The process of producing the model and of blocking out undercuts may take place virtually. Accordingly, the impression element may be produced directly by way of 3D printing or the like, and preferably by way of an additive production method.

Regardless of the type of production, it is essential that the impression element can always be reproducibly fastened to the jaw structure of a patient. So as to ensure this reproducibility, the impression element is made of a preferably rigid, and in particular non-elastic, material. Preferably, a non-elastomeric plastic material may be selected, such as a thermoplastic or thermoset material. Polyethylene terephthalate or polystyrene, for example, are preferred plastic materials.

In particular, it should be pointed out that an impression element according to the invention is not an element including an impression of the jaw structure which is created directly from the original jaw structure of the patient using a typically elastic impression compound. Production by way of impression preferably involves an impression of at least two generations, which is to say creation of the negative impression of the impression element according to the invention is preceded by at least one earlier creation of a negative and a positive impression, wherein the impression element of the invention is produced based on this described positive impression, which corresponds to the aforementioned jaw model.

The impression element itself may also be produced by way of 3D printing, milling technology, die casting or pressure spray processes or the like, in addition to thermoforming methods.

In order to detect and render the position of a spatial body in an exact three-dimensional manner, at least three points of a body that can be once again unequivocally radiologically identified must be spatially detected. This can be achieved, for example, by the aforementioned at least three X-ray visible/X-ray attenuating reference bodies, for example pinhead-sized, and preferably spherical, reference bodies, which are distributed on the impression element, for example one each in the two lateral jaw regions and one in the front region.

X-ray visible reference bodies shall be understood to mean bodies that can be represented in a radiologically recorded image and are preferably visually discernible to an observer. Such bodies are at least partially X-ray absorbent, and are thus X-ray attenuating.

In order for the association of the implants to be planned in correct positional arrangement, in one possible embodiment, further X-ray visible reference bodies and/or form-fitting elements may be disposed on the impression element or the X-ray template, for example for mounting to higher-level processing structures. The further X-ray visible reference bodies and/or form-fitting elements possibly used for attaching the drill sleeves in correct positional arrangement in a fastening element may be removed, in particular when they are no longer needed. The at least three X-ray visible reference bodies that are disposed at a distance from one another remain in the X-ray template.

After the impression element, which at least partially represents the negative impression of the upper or lower jaw of a person, has been thus prepared, the X-ray template is produced therefrom by applying the reference bodies. According to the invention, this is used to carry out a first three-dimensional radiological detection, in which the jaw of the person is detected, together with the X-ray template that comprises the reference bodies and is fastened to the jaw in a form-fit manner.

This can take place, for example, by what is known as digital volume tomography (DVT) or by computed tomography (CT). During such detection, data is detected which allows for virtual 3D representation of the jaw, together with the identifiable reference bodies of the X-ray template, using visualization software.

Another advantage may be utilized when using an X-ray template that is visible in tomography. The different areas of the oral mucosa not visible in the X-ray image (the fixed, or keratinized, and the non-fixed, or non-keratinized, mucosa) can be marked in an X-ray visible manner on the template surface. This information may be used in a meaningful manner during implant planning.

Another advantage may be utilized when using an X-ray template that is visible in tomography. The X-ray template can include zones having different, but preferably known, attenuation degrees (for X-rays) so as to calibrate the tomography to be prepared, and in particular calibrate this to Hounsfield units. In this way, the jaw sections can be better assessed for bone density, which is necessary for implantation. The calibration to Hounsfield units is advantageous in terms of simplifying or enabling visualization of the drill hole. Such calibration makes it possible to distinguish what is still bone and what is no longer considered bone in the different regions of the jaw.

The invention may provide for the zones having the different attenuation degrees to be arranged in a calibration plate that is connected to the aforementioned X-ray template. Such a calibration plate may have a U shape, seen in a top view, and in particular can thus retrace the progression of the row of teeth and/or jaw bone. Multiple zones having the known attenuation degrees may extend between the inner and outer edges.

Additional X-ray markers may be disposed on the inner and outer edges of the calibration plate, in particular such that they can also be used to reproducibly dispose the X-ray template, together with the calibration plate, in a higher-level fastening structure in the correct positional arrangement by way of mechanical form fitting, for example so as to place the at least one drill sleeve using the fastening structure.

For this purpose, the additional X-ray markers, which thus also serve as form-fitting elements, may be designed so as to protrude over at least one of the calibration plate surfaces, and preferably over both calibration plate surfaces. Apart from the additional X-ray markers and/or a thickened outer and inner edge, the calibration plate can be designed as a planar plate.

Such a calibration plate can be fastened to the X-ray template of the type mentioned at the outset, for example by way of bonding, before the first radiological detection. Preferably, the calibration plate is placed on the X-ray template. In this embodiment, the X-ray template, together with the calibration plate, is then radiologically detected with the patient, for the first time after having been fastened to the patient's jaw.

Thereafter, the calibration plate is removed again. Additional procedures described hereafter take place whether the X-ray template was detected with or without such a calibration plate.

Based on this first detection, it is also possible to plan the implants and determine the positions thereof, or the positions of guide channels required therefor, by way of 3D visualization of the jaw in question, for example using the visualization software of a DVT or CT device. The position data, which can include Cartesian and/or angle coordinates, for example, can preferably be stored in a manner that is associated with this first detection, and in particular as target position data or target planning data to be used at a later time.

The X-ray template previously produced from the impression element is then utilized to create a drilling template therefrom in a next step according to the invention, for which purpose at least one drill sleeve is fastened in the X-ray template.

Such fastening may take place based on, or as a function of, the above-described target position data or target planning data, so as to ideally obtain the planned progression of the guide channel by way of the drill sleeve.

For example, a drill sleeve defining the guide channel, or forming the same, may be disposed, as a function of the planned target position data, on the X-ray template including the negative impression of the jaw structure by producing a mounting element, which comprises a fitting piece and is adapted to the required position of the guide channel, by way of material working using a machine tool, wherein, during production, a form-fitting mounting structure, and preferably a form-fitting mounting structure that is periodic in at least two directions, is created on the mounting element as a function of the target position data or target planning data, by fastening a channel element, which already comprises the guide channel, in particular in the form of a metal sleeve, comprising a fitting region that corresponds to the fitting piece of the mounting element, and in particular is formed by the guide channel itself, to the produced mounting element, and by fastening the pairing of the mounting element and the channel element fastened to one another, in a location calculated as a function of the position data, to a mounting plate having a corresponding form-fitting structure, and in particular a periodic structure in at least two directions, using the form-fitting mounting structure of the mounting element, by fastening the X-ray template opposite the mounting plate by way of a fastening element, and by disposing the channel element on the X-ray template by fastening, and in particular adhesive fastening, and detachment from the mounting element.

Such fastening of a drill sleeve or a guide channel to an impression element is described in DE 10 2014 007 870 A1, for example, and known to a person skilled in the art. Instead of the impression element described in DE 10 2014 007 870 A1, the X-ray template previously produced therefrom is used within the scope of the invention.

For the present invention, this manner of fastening shall not be understood to be of a necessarily limiting nature, but only as an example. In the present invention, the manner in which the drill sleeve defining the guide channel is fastened to the X-ray template is irrelevant.

Furthermore, it is possible to carry out the following steps so as to fasten a drill sleeve in the X-ray template in correct positional arrangement:

1. applying an excess amount of plastic in the region of the sleeve position to the X-ray template
2. creating a hole in the applied plastic using navigation aids (GonyX, HexaPod table or the like)
3. pressing in and gluing the sleeve manually, or using navigation aids
4. manually finishing (reducing excesses) and reconfiguring to yield the drilling template, and polishing The method according to the invention, in particular, takes advantage of the fact that an impression element including a radiological reference, which is to say the described X-ray template, which is also detected during the imaging of the jaw region of the patient, is reworked into a drilling template, while remaining unchanged in the region of the radiological reference, thereby making it possible to radiologically check the alignment of the drill sleeve. The X-ray visible reference bodies of the X-ray template should therefore not be changed when the X-ray template detected by three-dimensional X-ray imaging (DVT/CT) is being reworked into a drilling template, so as to allow the drill sleeves to be checked at a later time.

The advantage of this procedure of reworking the X-ray template (the impression element comprising the radiological reference) into a drilling template, and not producing a new template for this purpose, is that exact fitting of this X-ray template, or of the original impression element, can be checked on the jaw of the patient prior to the radiological imaging (DVT) process, and can be adapted, if necessary, without triggering additional measures in further procedures for the accuracy of the fit, and further checks that are otherwise necessary with templates that are newly produced.

A further advantage of this procedure is that the fit of the X-ray template on the jaw or the teeth of the patient can be checked in the multiplanar reconstruction (MPR) representation of the tomography.

After the at least one drill sleeve is fastened, according to the invention, the alignment thereof is checked, in particular for the purpose of subsequently checking the deviations from the planned progression.

For this purpose, according to the invention, a reference object is inserted, which itself comprises at least three spaced X-ray visible reference bodies, into the at least one drill sleeve. If multiple drill sleeves are to be detected simultaneously with respect to the actual positions of the guide channels they define, one such reference object can accordingly be inserted into each of the drill sleeves to be detected.

Each reference object can, for example, comprise a body that is form-fitting with respect to the drill sleeve, such as a cylindrical body. In the case of a cylindrical body, the outside diameter thereof may be adapted to the inside diameter of a drill sleeve so that the cylindrical body can preferably be inserted into the drill sleeve without a gap, and thus, in particular, without clearance. In this way, an axis of the form-fitting body, for example the center line thereof if this has a cylindrical design, can be aligned in a collinear manner with the center line of the guide channel of the drill sleeve.

The position of the axis of the reference object relative to the at least three reference bodies is known and stored, for example, in a data set in software for visualization. For this reason, the actual position of the guide channel can also be automatically determined based on the reference bodies thereof by way of determining the position or location of the axis of the reference object, since these positions correspond to one another by virtue of the form fit.

Preferably, a form fit is created directly by the use of the form-fitting body, so that the reference object is automatically correctly aligned in the space in the direction of the drill sleeve.

For example, the X-ray visible reference bodies can all be disposed only on one side of the form-fitting body. One embodiment may also provide for a reference body to be fastened, in the axial direction, on the one side of the aforementioned body and for at least two reference bodies to be fastened on the other side of the form-fitting body, seen in the axial direction.

The aforementioned one reference body can be fed through the drill sleeve in the insertion direction, in particular due to the design thereof in terms of size and position, and in the inserted position is preferably located outside the drill sleeve, as are the other reference bodies disposed toward the other side.

A system for carrying out the method can include drill sleeves, for example, that can be inserted as a finished element into a jaw impression element, or the X-ray template produced therefrom, so as to define a drilling guide channel along the inner sleeve extension, and can comprise at least one reference object, which carries at least three X-ray visible reference bodies disposed at a distance from one another and is adapted to the sleeve, so as to be inserted therein in a form fit manner.

A respective drill sleeve and a respective reference object can have structures that are adapted to one another so as to engage one another when a reference object is inserted into a sleeve, in particular to achieve rotational invariance, which is to say a non-rotatable plug connection. The respective structures are preferably disposed at or on the mutually adapted surfaces, and preferably at the cylindrical surfaces or opposing annular surfaces of the two elements. For example, the drill sleeves may include notches for correctly aligning the implants in a fixed rotational position. Accordingly, corresponding protruding projections may be provided in the reference bodies, which can engage in these notches. Mutually opposing annular surfaces of the drill sleeve and the reference object may be designed, for example, so that these can be brought in mutual engagement with one another, and preferably each have a shape deviating from a circular shape, so that engagement is only possible in a certain rotational position, for example the annular surfaces can have respective multi-sided shapes, for example as corresponding inner and outer multi-sided shapes, for example hexagonal shapes.

The edges of an implant insertion post can be also brought in line with the multi-sided shape of the sleeve during insertion of the implant.

A drill sleeve and/or a reference object can furthermore comprise means, and in particular can comprise a clamping device, by way of which the center lines of the sleeve and the reference object can be centered with one another, in particular when centering by way of a preferably play-free fit between the drill sleeve and the reference object is nor already sufficient.

Subsequent to the steps described at the outset, according to the method a second three-dimensional radiological detection is carried out, in which only the drilling template, which is outside the jaw of the patient, including the reference bodies thereof, and the at least one reference object inserted therein, including the reference bodies thereof, is detected. This has the advantage that the patient does not need to be available for this second radiological detection and is also not exposed to further radiation.

It is particularly advantageous here if an impression element of a jaw into which the implants are to be introduced later is first used as an X-ray template, by providing X-ray reference bodies, and is later reworked into a drilling template, by providing at least one drill sleeve, and is thus used a second time, since exactly the same fit for the jaw structure of the patient then results with the two uses.

If the fit of an impression element, or of an X-ray template created therefrom, has already been checked manually and X-rayed together in the patient's mouth, this position can be considered to be known for further processing into a drilling template. This is a great advantage for the safe use of the drilling template during surgery, and for checking the accuracy of the template. The position of the impression element, or of the X-ray template, in the patient's mouth that is already known from the X-raying process can be used for checking the drill sleeves that are incorporated into the X-ray template, which has been converted into the drilling template.

Here again, detection is preferably carried out in such a way that the detected data can be used to create a virtual 3D representation of all reference bodies, which is to say those of the X-ray template and those of the at least one reference object.

If one or all the drill sleeves of the drilling template are equipped with X-ray reference objects, the drilling template may be placed and scanned in a volume tomograph (DVT) or computed tomography, for example, so as to detect all reference bodies. Here, it is possible to X-ray the drilling template alone, based on the additionally introduced X-ray reference objects, so as to check the accuracy thereof, without having to X-ray the patient a second time. The locations of all guide channels or all implants that are achieved with the finished drilling template are calculated by way of electronic data processing, since the respective position can be determined from the location of the X-ray reference body of each reference object.

The positions of the guide channels/implants ascertained from the geometry of the drilling template are compared to the locations of the planned guide channels/implants, in particular by using the planning data stored, for example, in a manner associated with the first detection.

In the superimposition, the respective guide channel belonging to a drill sleeve, or an implant to be inserted therein, may be virtually visualized in relation to the jaw and/or a planned guide channel/implant.

In particular, this is made possible in that the at least three X-ray visible reference bodies exactly define the location of the reference object in the space on a respective reference object that is insertable or inserted into a drill sleeve. Since the location thereof, due to form fit, coincides with the drill sleeve, and thus, for example, an axis thereof is parallel to the center line direction of the drill sleeve, the guide channel itself that is achieved by way of the drill sleeve, or a respective drill hole determined thereby, is thus similarly defined by the reference bodies of the reference object and can be represented in the visualization.

Visualization of virtual drill holes that are to be expected as a function of the detected position data of a reference object is especially advantageous, in particular since drill holes can be represented very clearly, for example in an opaque 3D representation of the jaw. Likewise, the contact to be expected between the bone and the surface of the implant to be placed, in particular with a reduced bone mass in the spongy region of the jaw, can be represented either in percentage form or in absolute numbers. Instead of describing the ratio of the implant surface that makes contact with the bone at the entire implant surface in numbers, this may also be described by way of bar, column or pie charts.

In order to provide a better view of the contact to be expected between the bone and the implant, the peripheral surface of the implant bed to be expected can be represented as a surface area developed onto a flat plane. The implant bed shall be understood to mean the surface area of the implant with which the bone makes contact. Such a representation may take place separately or together with the visualization of the aforementioned superimposition.

The invention thus specifically allows the surgeon to assess the deviations based on the visualization. In contrast to the prior art, the surgeon is thus not confronted with columns of figures that are not very meaningful. In a preferred refinement, based on the measurement data of the first radiological detection and the second radiological detection relative to the jaw of the person, the actual position data of a guide channel associated with a respective drill sleeve, or of an implant inserted or to be inserted therein may be calculated, and compared with associated planned target position data, and in particular deviations therefrom in numerical values may be ascertained. For example, 3D representation, as well as evaluation or determination of actual position data, can be performed by way of visualization software, for example that of a DVT or CT device or that of a separate provider.

Distances, angles and coordinates can be transmitted directly, for example, via this software, in particular that of the DVT or CT device.

For example, deviations can be ascertained from the implant shoulders of a virtual implant associated with the respective drill sleeve and of the virtual planned implant, or from the implant apices of the virtual implant associated with the respective drill sleeve and of the virtual planned implant, or from the center lines of the virtual implant associated with the drill sleeve and of the virtual planned implant, or from the axial rotational angle positions of the virtual implant associated with the respective drill sleeve and of the virtual planned implant.

In order to ascertain deviations, a procedure can additionally be programmed, for example in implant planning software, which ascertains the respective positions of the drilling template and the drill sleeves or inserted reference objects thereof by way of the reference bodies, and calculates deviations from the planned target position data for the implantologist. The program can compare the respective planned implant position to the actual implant position achieved with the drilling template. In this way, the implantologist is able to estimate whether this drilling template is suitable for the planned operation. The described deviations or measurement values that can be established here, with respect to implants, can likewise be determined for guide channels, since the implant position is at least substantially defined by the guide channel position.

Measurement of the bone density of adjoining jaw structures can be performed in the volume tomography image, by way of the known degree of attenuation of the X-ray visible reference bodies. If the bone density is known, a suitable drilling sequence for the planned implant bed can likewise be ascertained.

The drill hole in the jaw to be achieved with the ascertained drilling sequence can likewise be created three-dimensionally in a visual manner in the bone rendering of the jaw on the monitor. In this way, the implantologist is able to detect and assess the remaining bone density three-dimensionally, following the virtual completion of the drill hole. He can run through multiple situations prior to the surgery and determine the most suitable one.

For determination of deviations, according to the invention the measurement data of the first three-dimensional radiological detection and the measurement data of the second radiological detection are preferably superimposed, in particular in a virtual three-dimensional screen representation, and in particular by eliminating positional deviations between the reference bodies of the drilling template in the visual representations of the two detections. This superimposition may be performed automatically, for example by software for displaying the virtual 3D representation, for example by way of a best fit algorithm, which centers the reference bodies of the drilling template that has been created in the second radiological detection on the reference bodies of the preceding X-ray template in the first detection. Generally, however, a surgeon can also superimpose these manually.

By superimposing, or displaying and hiding, the virtual implants, or the guide channels, in the view of the volume tomography image, the implantologist is able to gain a precise idea of deviations.

In addition, it is also possible, for example, to visualize the planned drill hole in the ascertained geometry in the two-dimensional tomograms and in a three-dimensional tomographic view. Based on this view, the implantologist is able to gain a clear idea of the bone surrounding the planned implant.

Each of the designs can be used to check a correct location of the drill sleeves, which later form the guide channel for the implant drill.

The invention can furthermore provide that structures corresponding to one another, which are provided on the respective mutually facing surfaces, are brought into engagement with one another to achieve a rotation-invariant form fit between a respective cylindrical drill sleeve and a cylindrical reference object to be inserted therein, in particular projections and recesses, and preferably tongue and groove or corresponding outer and inner multi-sided shapes. In the joined state, the exact rotational position of the drill sleeve with respect to the X-ray reference object or the implant can thus be predefined.

The invention can also provide for the drilling template to be surrounded by an X-ray absorbing material, such as aluminum or a similar low-absorption material, and in particular for the drilling template to be disposed in a cylinder made of X-ray absorbing material, such as aluminum or a similar low X-ray absorption material, during the second radiological detection. In this way, an at least approximately similar X-ray degree of attenuation of the X-ray reference bodies can be achieved during the second detection, in relation to the first detection. This cylinder, which can be open at the top and the bottom, simulates the soft tissue of the patient.

Using the described procedure, the surgeon is thus given a visual option, prior to the surgery, of representing the deviations of the implant position in the 3D rendering and in the multiplanar reconstruction (MPR) representations of volume tomography (DVT) or computed tomography (CT). In this way, the surgeon is able to exactly evaluate the position to be expected of the implants to be placed using the present drilling template.

Overall, the checking method will be significantly simplified by the described invention. In this way, the accuracy check could be used significantly more often in the future and become part of a quality management process.

The present described method makes it possible to check a drilling template using the devices already present in the dental practice, and new options for visualizing the planned implantation with dental implants are created.

An exemplary embodiment of the invention will be described in more detail based on the following figures.

FIG. 4 shows the respective percentage of the implant surface that is in contact with the bone of the jaw for three different implants, for example.

An X-ray reference is provided on the impression element 1, which is formed by at least three X-ray visible reference bodies 2 that are disposed in different positions and can be identified again in the X-ray detection. As a result of this provision, an X-ray template within the meaning of the invention is formed from the impression element.

The reference bodies 2 are disposed at a distance from one another and are each fixedly connected to the impression element 1 and are used to define the spatial position of the impression element, and/or to bring different X-ray detections of the same X-ray template thus formed, or the drilling template formed therefrom at a later time, into the representation (preferably virtual 3D representation in agreement/superimposition).

For a first radiological detection, the X-ray template made of the impression element 1 provided with the reference bodies 2 is fastened the jaw, such as the lower jaw or the upper jaw, into which at least one implant is to be placed, wherein, due to the negative impression, a clear and reproducible fit with the jaw is achieved. In the radiological detection, which can be performed, for example, by a three-dimensional dental volume tomogram, the jaw structure of the patient is thus rendered, as are the X-ray visible reference bodies 2. Based on this detection, the planned position data for guide channels or the implants is also created.

Figure 1:
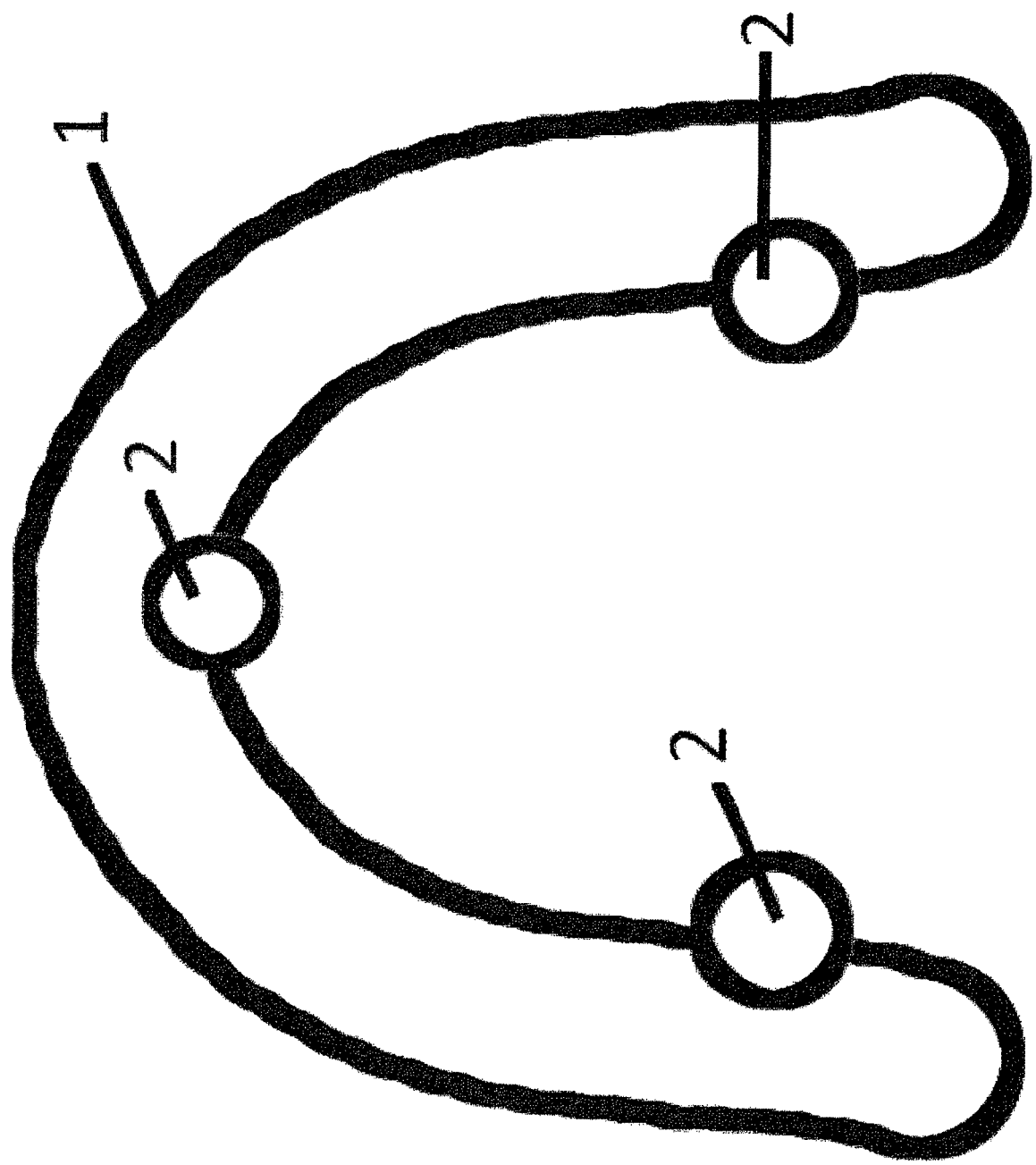
FIG. 1 shows a top view onto an impression element 1, which includes a negative impression of a jaw structure of a patient, so as to ensure a clear fit on the jaw of the patient.
Figure 1A:
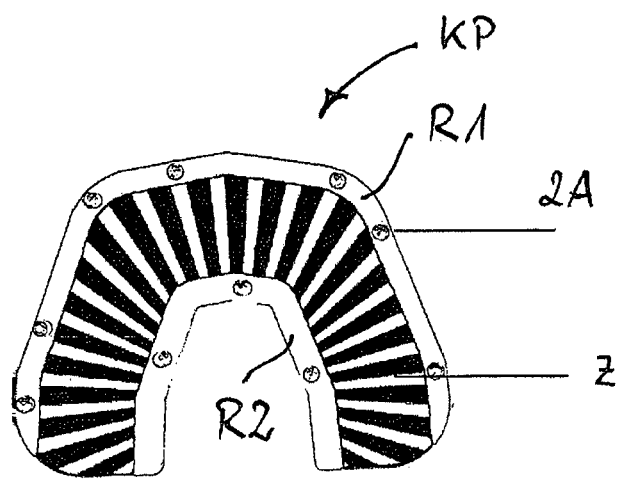

In a possible refinement, a calibration plate KP according to FIG. 1A may also be fastened to the X-ray template, such as by way of bonding, prior to the first radiological detection. The calibration plate KP traces the shape of the progression of the teeth or the jawbone, and accordingly essentially has a U shape, seen from above. Additional X-ray markers 2A are located on the outer edge R1 and on the inner edge R2. Zones Z having different, but known, X-ray attenuation degrees extend between the edges R1 and R2.

Such a calibration plate KP can also be detected in the first radiological detection for the purpose of the calibration to Hounsfield units. Afterwards, this is immediately removed again or, in the interim, serves as a mounting element for fastening the X-ray template in a higher-level processing structure for fastening at least one drill sleeve. In this case, the plate KP is removed before the second radiological detection. In a subsequent step according to the invention, the X-ray template is reworked into a drilling template, wherein the fit with regard to the jaw of the patient and the positions of the reference bodies 2 are preserved. For this purpose, at least one drill sleeve is fastened to the X-ray template, by way of which a guide channel is defined, through which an implant drill is later fed, so as to carry out the implant drilling according to the guide channel alignment.

Figure 2:
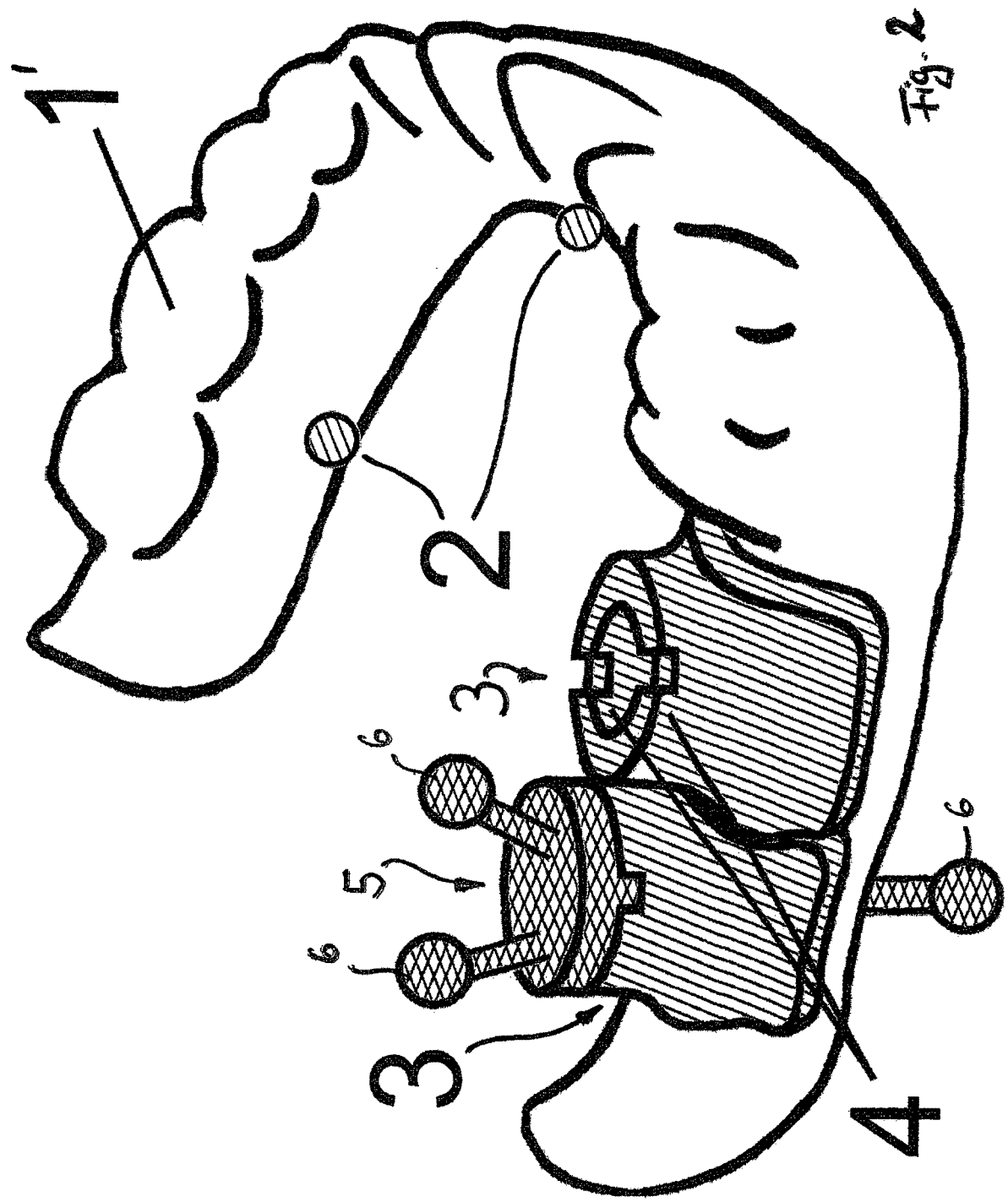
FIG. 2 shows the drilling template created for the implantation.

FIG. 2 shows the drilling template 1' created for the implantation, which corresponds to the X-ray template or the impression element 1 including the reference bodies 2 and which, in this example, comprises two drill sleeves 3 fastened thereon. The drill sleeves 3 are disposed in prefabricated channel elements here, which were fastened to the X-ray template as a function of planned target position data, for example according to the method described in DE 10 2014 007 870.

For positioning the implants in the respective planned rotational position in correct positional arrangement, the drill sleeves 3 can include notches 4 here on the top, in the end-face annular surface which, in particular, extend radially with respect to the drill sleeve axis. The number of notches, edges or other rotation-asymmetrical variations are predefined by the respective implant system.

FIG. 2 shows that a reference object 5, which is connected in a form-fit manner to the drill sleeve 3, is inserted into the left drill sleeve 3. A protrusion region corresponding to the notches 4 engages in the notches 4, so that the reference object 5 is fastened in a rotation-invariant manner in the drill sleeve 3 and assumes a position that is defined by the drill sleeve alignment.

Such a reference object 5 comprises three X-ray visible reference bodies 6 here. Based on these reference bodies 6, the position of an axis can be determined in a radiological detection, which has a known position relative to the reference objects 6 and which preferably is assumed parallel to the center line of the drill sleeve 3 when the reference object 5 is disposed in the drill sleeve 3.

This drilling template shown in FIG. 2 is used to carry out a second radiological detection, but without the drilling template being placed on the patient. The detection is preferably identical to the first detection in terms of technology, which is to say, for example, the detection likewise produced by a digital volume tomography image, so that both the first and the second detection can be virtually represented three-dimensionally in the same manner, for example based on DICOM files created during the detections.

The two detections can be superimposed so that the reference bodies 2 that are identifiable in the two detections are located on top of one another. The actual position data of the guide channels resulting from the second detection, namely by determination based on the reference bodies 5, can then be compared, for example, to target position data of planned guide channels resulting from the first detection of the jaw, together with the impression element 1.

For this purpose, the guide channels associated with the actual positions and the guide channels associated with the target positions can be visually represented in a virtual manner, for example, so that an implantologist is able to assess the deviations not only based on numerical values, but visually in the surrounding area of the jaw structure visualization, which also results from the first detection.

It is thus possible, if potential deviations are present, to assess whether the deviating guide channel will result in injury to areas to be protected, such as nerve tracts, if drilling were to be carried out through the drill sleeve in question, or whether the drill sleeve can be used, despite a deviation. Instead of determining the deviation of guide channels, it is also possible to determine the deviation of implants.

Figure 3:
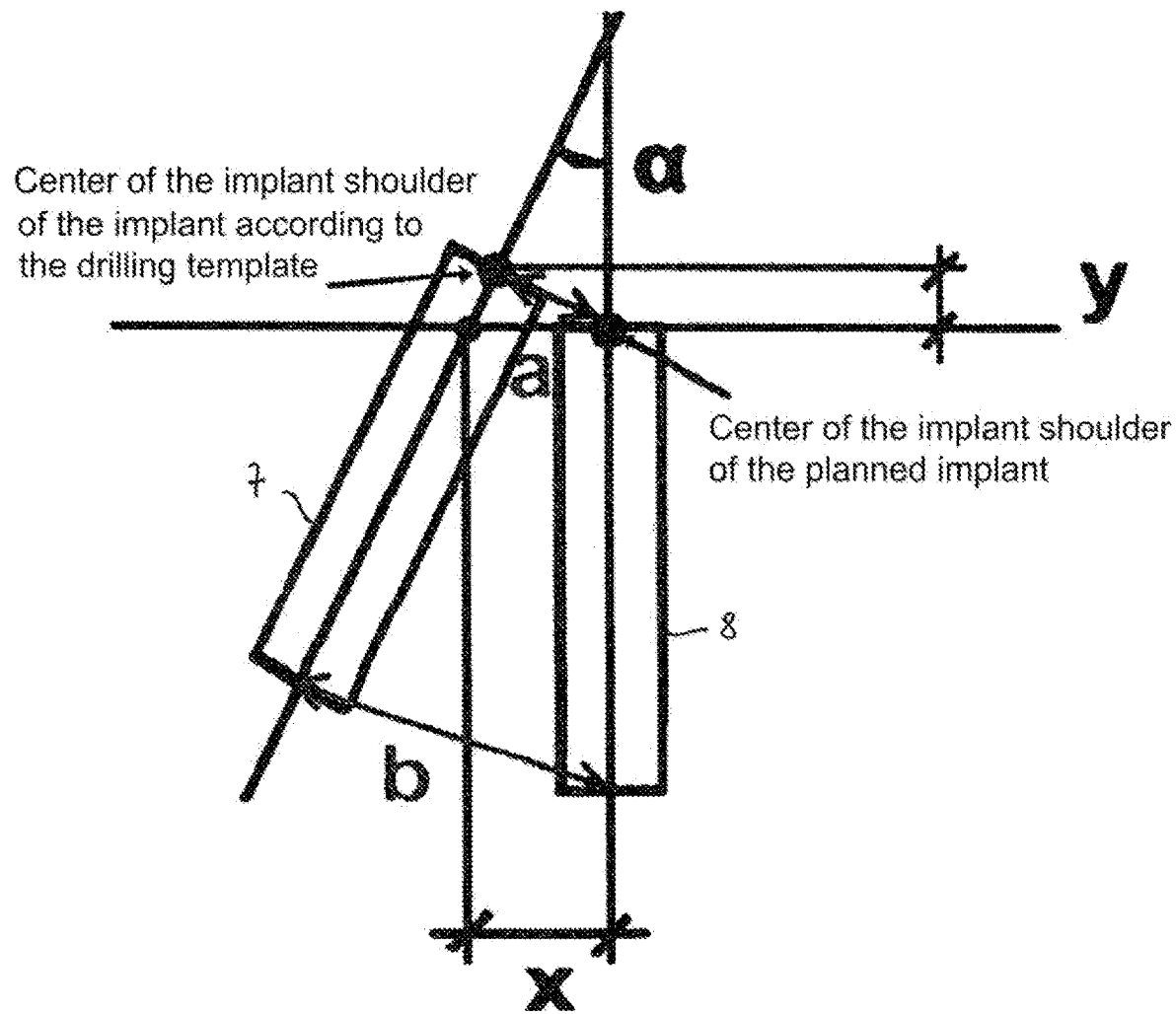
FIG. 3 shows the visualizations of the actual guide channel and the target guide channel or the implant assumed to be inserted therein.

FIG. 3 shows the visualizations of the actual guide channel 7 and the target guide channel 8, or the implant assumed to be inserted therein, in particular only in a 2D section of a possible 3D visualization, omitting visualized jaw structures for the sake of simplification.

It is thus possible to calculate dimensions for the deviations a of the center of the implant shoulders, the angular deviation a of the implant axes, and the deviations b of the centers of the implant ends of the planned implant, from that which would result if the guide channel of the drill sleeve were used, directly by way of the dimensioning function of the software of a DVT or CT X-ray machine, for example. In this way, the implantologist can also use the calculated dimensions for evaluating the precision.

FIG. 4 further shows the respective percentage of the implant surface that is in contact with the bone of the jaw for 3 different implants, for example. This is shown as a purely numerical value in the center. On the right, a planar development of the implant bed is also visualized for the implant, which is to say the surface regions of the implant surface that are in contact with the bone and thus act as a bed. The visualization alerts the implantologist in the case of insufficient contact at the outset. The right-hand development shows positions where there is no contact with bone in the respective recessed regions 8.

The visualized regions of contact and non-contact between the bone and the implant surface, or the described number ratio, are preferably formed automatically from the data of the first and second radiological detections, based on a certain implant to be inserted, of which the geometric data, and in particular shape and/or surface magnitude, are known. Such an evaluation can be performed by the software, which also carries out the visualization of the superimposition.

The invention claimed is:

1. A method for detecting the alignment of at least one drill sleeve in a drilling template relative to the jaw of a person, comprising the following steps:
   a. creating an impression element including a negative impression of the jaw structure of a person;
   b. creating an X-ray template from the impression element by introducing at least three X-ray visible reference bodies that are disposed at a distance from one another into the impression element;
   c. carrying out a first three-dimensional radiological detection, in which the jaw of the person, together with the X-ray template fastened to the jaw in a form-fit manner, are detected;
   d. as a function of planning data to achieve a planned guide channel progression creating a drilling template from the X-ray template by fastening at least one drilling sleeve to the X-ray template;
   e. inserting a reference object, including at least three spaced X-ray visible reference bodies, into the at least one drill sleeve in a form-fit manner; and f. carrying out a second three-dimensional radiological detection, in which only the drilling template, which is outside the jaw, including the reference bodies thereof, and the at least one reference object inserted therein, including the reference bodies thereof, are detected, and further comprising, prior to the first radiological detection, fastening a calibration plate to the X-ray template, wherein the calibration plate comprises X-ray markers and multiple zones having different, known X-ray attenuation degrees, and wherein each of the zones extends between an inner and an outer edge of the calibration plate, and removing the calibration plate from the X-ray template before the second radiological detection.

2. The method according to claim 1, wherein, based on measurement data of the first radiological detection and the second radiological detection relative to the jaw of the person, position data of a guide channel or drill hole associated with a respective drill sleeve, or of an implant to be inserted therein, is calculated and compared to associated planned position data to ascertain deviations therefrom.

3. The method according to claim 2, wherein the deviations are ascertained from
   a. shoulders of a virtual implant associated with the drill sleeve and of a virtual planned implant;
   b. implant apices of the virtual implant associated with the drill sleeve and of the virtual planned implant;
   c. center lines of the virtual implant associated with the drill sleeve and of the virtual planned implant; and
   d. axial rotational angle positions of the virtual implant associated with the drill sleeve and of the virtual planned implant.

4. The method according to claim 1, wherein measurement data of the first three-dimensional radiological detection and measurement data of the second radiological detection are visually superimposed in a virtual three-dimensional screen rendering, and by eliminating positional deviations between the reference bodies of the drilling template in the visual representations of the two detections, and the respective guide channel or drill hole belonging to the drill sleeve, or an implant to be inserted therein, or the representation of an angled contact surface between the bone and the implant is visualized in a virtual manner in relation to the jaw or a planned drill-guide channel or drill hole or an implant.

5. The method according to claim 1, wherein the reference object and the drill sleeve are each cylindrical and on mutually facing surfaces of the reference object and the drill sleeve structures are provided which structures fit together and prevent rotation of the drill sleeve and the reference object relative to each other and the reference object is thereby non-rotatably engaged with the drill sleeve.

6. The method according to claim 1, wherein the drilling template is surrounded by an X-ray attenuating material during the second radiological detection.

7. The method according to claim 1, wherein each of the radiological detections is digital volume tomography or computed tomography.

8. The method according to claim 6, wherein the X-ray attenuating material is aluminum.

9. The method according to claim 8, wherein the surrounding of the drilling template by an X-ray attenuating material comprises disposing the drilling template in a cylinder made of aluminum.

* * * * *